United States Patent [19]

Stern

[11] Patent Number: 4,503,640
[45] Date of Patent: Mar. 12, 1985

[54] UNITIZED CONSTRUCTION FOR SLIDING CLOSURES AND METHOD FOR MAKING

[76] Inventor: Melvin J. Stern, 940 Douglas Ave., Longwood, Fla. 32750

[21] Appl. No.: 476,198

[22] Filed: Mar. 17, 1983

[51] Int. Cl.³ .............................................. E05D 13/02
[52] U.S. Cl. ........................................ 49/425; 49/501; 52/658; 403/402
[58] Field of Search ..................... 49/425, 501; 52/657, 52/658, 645; 403/401, 402

[56] References Cited

U.S. PATENT DOCUMENTS

| | | | |
|---|---|---|---|
| 2,736,403 | 2/1956 | Gwynne | 52/645 |
| 2,931,434 | 4/1960 | Steel | 49/425 X |
| 3,202,245 | 8/1965 | Le Tarte | 43/401 |
| 3,802,105 | 4/1974 | Bendix | 52/658 X |

Primary Examiner—Kenneth Downey

[57] ABSTRACT

A screen or patio door adapted for sliding along a track in a doorway or other opening includes a generally rectangular frame of extruded aluminum channel having four generally L-shaped corners, at least two of the corners positioned along the bottom of the door and adapted to slide along the track. Each corner is formed by a 90° miter cut leaving a web of aluminum material bridging the cut, and thereafter bending the channel about the web to form the corner. The corners all include a corner lock extending through the channel and bridging the miter, with fasteners extending through the channel. The fasteners extend through and expand the corner lock to fill the channel, thereby forming an inside wall bridging the miter cut and unitizing the corner construction.

14 Claims, 7 Drawing Figures

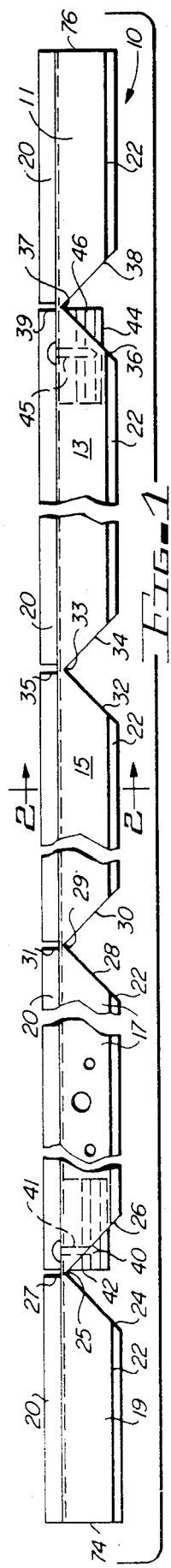
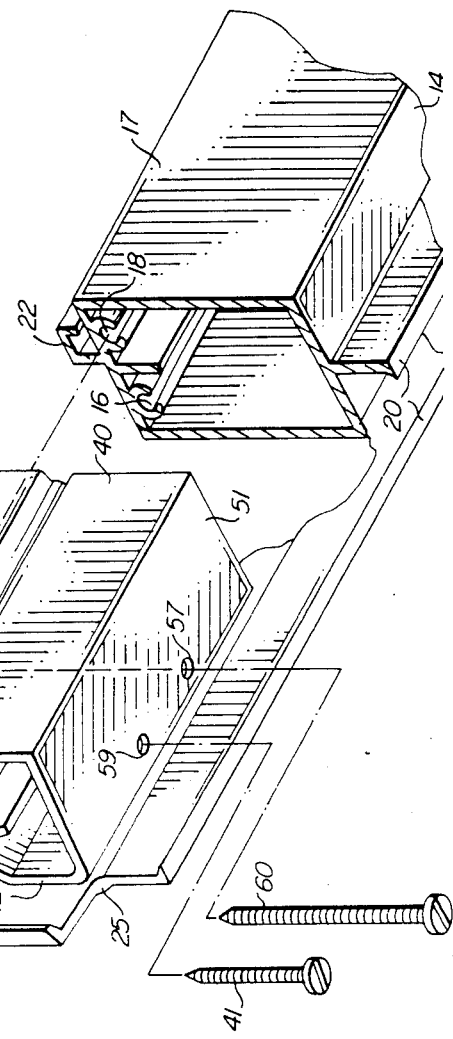
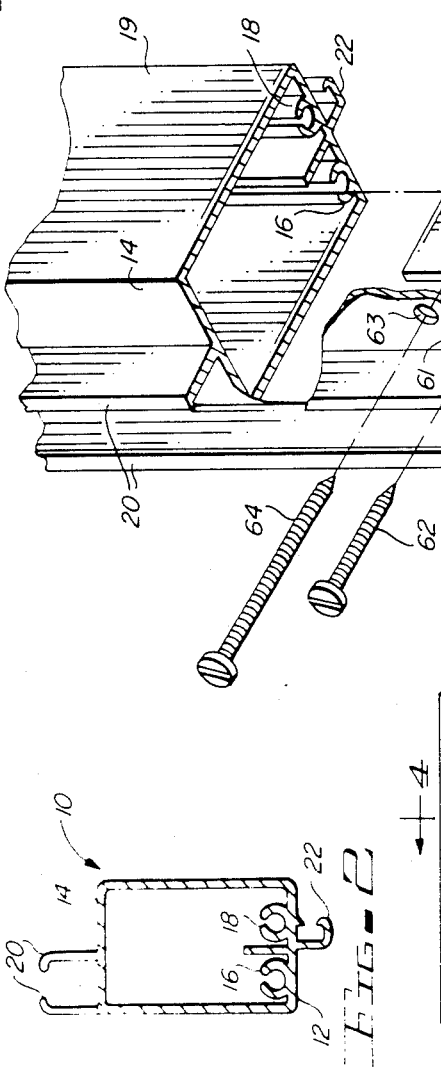
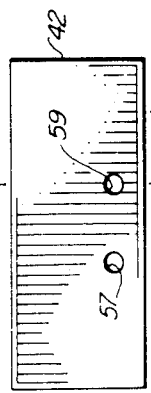
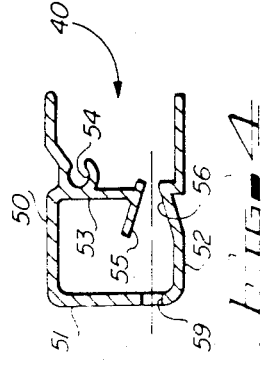

ly, the present invention relates to a rigid construction (and the method for making that construction) for sliding closures designed to avoid difficulties previously experienced with such closures during sliding.

2. Description of the Prior Art

Sliding doors and windows are typically fabricated from extruded aluminum formed in a rectangular configuration. It is conventional to form a corner for such closures by cutting two lengths of the aluminum channel material with a bevel and butting the beveled cuts together to form an L-shaped corner. The corner may be fastened by L-shaped brackets on either (or both) the inside or the outside of the corner, with fasteners joining the bracket to each side of the corner.

It is also known to provide an insert having an outer diameter configured to the inner diameter of the channel, and sliding the insert into the channel to bridge the slot between the two lengths of channel material forming the corner material. The insert is then held in place by a mating extrusion or similar means.

There are certain uses of sliding closures where the above-described corner constructions have proven to be unsatisfactory. Of particular significance are uses for screened patio and porch doors designed to slide along horizontal tracks. Such doors typically have rather long vertical and horizontal dimensions, and carry a flexible material (i.e. screen) which does not impart any rigidity to the overall structure. As a result, such doors are particularly susceptible to twisting and distorting forces caused by any binding in the bottom of the track (where the weight of the door is supported). Since such doors are usually outside, binding frequently results from leaves, dust and the like which are lodged in the bottom track. When this happens, the twisting and distortion may cause the corners of the door to become out of square, resulting in binding.

SUMMARY OF THE INVENTION

The present invention contemplates a rigid construction for sliding closures which is designed to overcome the problems discussed above.

The method of the present invention is designed to make a rigid closure construction for a sliding door, window or other closure from a length of channel material, and includes the steps of forming a lateral V-shaped slot in the channel, leaving an outer web of the channel material between the sides of the slot. The channel is then bent laterally along the web so that one side of the slot abuts the other side, while extending a corner lock through the channel and bridging the slot. Fastening means are provided extending through the channel and the corner lock for rigidly connecting the two sides of the corner together with the corner lock.

Preferably, the corner lock is provided with an expander operable to expand the lock into a tight fit within the aluminum length upon insertion of a fastener.

In a preferred embodiment of the method of the present invention, the door is fabricated from a length of extruded tubular aluminum channel material through which four mitered cuts are made in order to create all four corners of the door. The extruded tubular aluminum channel has two parallel screw bosses extruded integrally therewith and extending along the inner surface of one side. The fasteners for interconnecting the opposite sides of each mitered corner and the corner lock extend into one or the other of these screw bosses.

The present invention is also directed to a particular sliding door construction incorporating the rigid corner construction, and further contemplates that at least two of the corners, along the bottom of the door, are provided with wheels positioned in close proximity to a respective bottom corner.

In a preferred embodiment of the construction of the present invention, the corner lock is provided with a screw boss extending parallel with the expander, permitting an additional fastener to be extended through that screw boss for further rigidity.

THE DRAWING

The present invention will be described in detail below with respect to the accompanying drawing.

FIG. 1 is a front view of a length of aluminum channel material prior to fabrication of a screen door in accordance with the present invention.

FIG. 2 is a cross-section of the length of channel shown in FIG. 1.

FIGS. 3 and 4 are front and cross-sectional views, respectively, of the corner lock in accordance with the present invention.

FIG. 7 is a perspective view illustrating a corner portion of the sliding door of FIG. 6.

DETAILED DESCRIPTION OF THE PREFERRED EMBODIMENT

Figure 6:
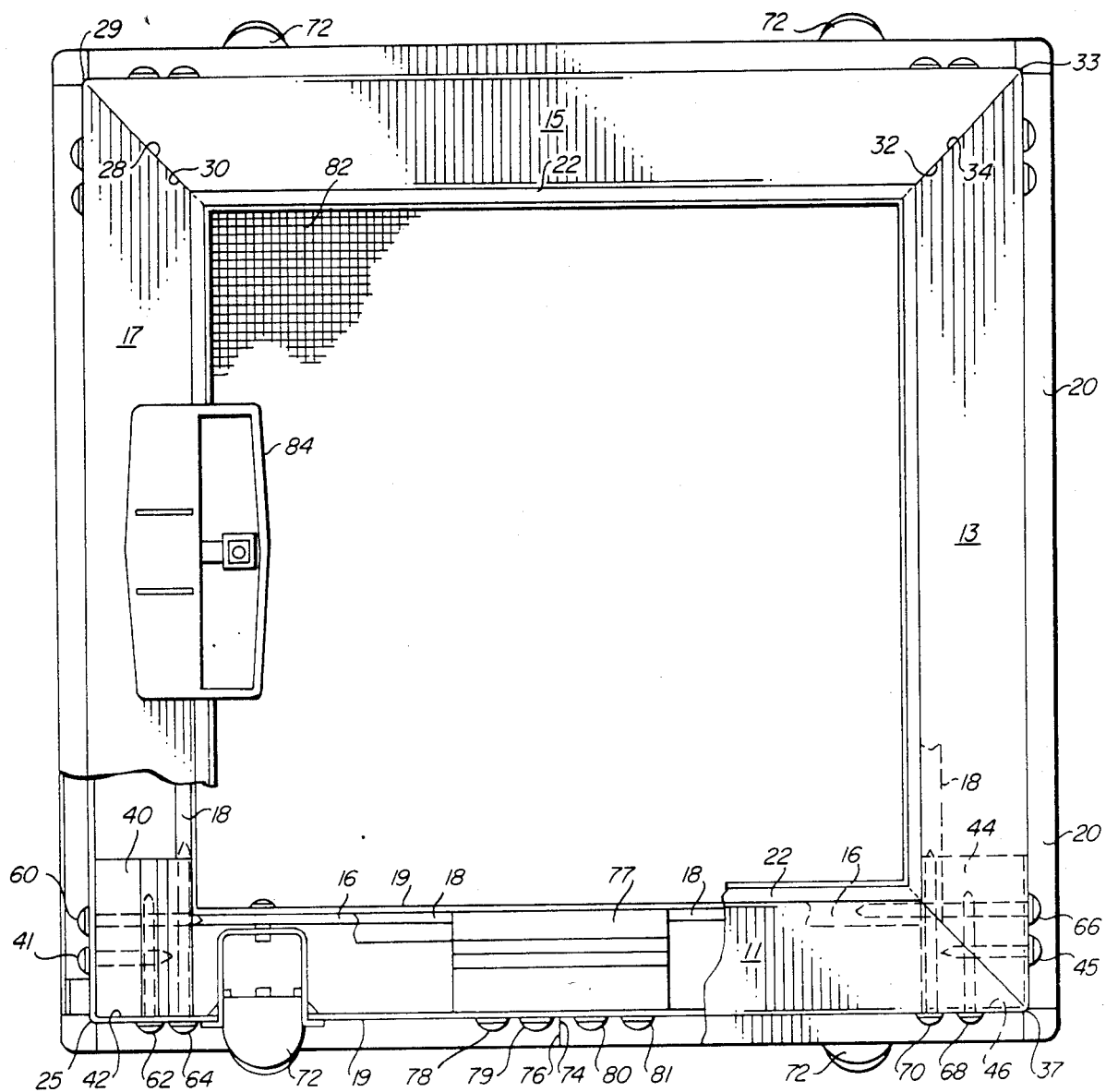
FIG. 6 is a front elevation, partially cut away, of a sliding screen door manufactured in accordance with the present invention.

A preferred embodiment of the rigid closure construction in accordance with the present invention will now be described, and with specific reference to the preferred method of manufacture.

Noting FIGS. 1 and 2, the starting material for the screen door comprises an elongated length of extruded aluminum channel, referred to by the reference numeral 10, formed in a generally rectangular cross-section configuration. The channel includes two opposing side walls 12, 14 with a screen spline 22 extruded with the channel 10 along the outside surface of side 12, and with a pair of parallel, longitudinal screw bosses 16, 18 extruded along the inside surface of the side 12. A pair of rails 20 extend outwardly and are extruded integrally with the second side 14 (note FIG. 2).

Initially, the length of channel 10 is provided with four 90° miter cuts laterally through the channel at predetermined spaced intervals along its length, each cut extending through the one side 12, and forming opposing sides of the respective miter cut which are identified in FIG. 1 as follows: a first cut obtains mitered sides 24, 26; a second cut, sides 28, 30; a third cut, sides 32, 34; and a fourth cut, sides 36, 38. Each mitered cut is extended through the channel 10 but short of the side 14, so as to leave a web 25, 29, 33 and 37 bridging the opposing sides of the respective cut. A vertical cut 27, 31, 35 and 39 is then made in the railings 20 to leave the respective web 25, 29, 33 and 37 as an interconnection between adjacent portions of the channel 10. As is shown in FIG. 1, these portions of the channel 10 are identified by reference numerals 11, 13, 15, 17 and 19.

A next step in the manufacture of the sliding patio door according to the present invention contemplates the insertion of at least two corner locks into the mitered cuts which form the two corners along the bottom of the door after construction. For purposes of this disclosure, these corners are arbitrarily selected as being the corners defined by mitered sides 24, 26 and 36, 38; however, as will be understood by those skilled in the art, the bottom corners may be fabricated at other locations along the channel 10. It will also be understood that the preferred construction will include a corner lock in all four corners of the door.

The particular features of the corner lock in accordance with the present invention are shown in FIGS. 3 and 4. One of the corner locks, referred to by the reference numeral 40, includes a first end 42. As is shown in the cross section of FIG. 4, the corner lock 40 is formed from a length of extruded material having opposing sides 50, 52 with an extension 53 extending normal from the surface 50 into the space between the two surfaces 50, 52. The extremity of the extension has a bevel 55 thereon which forms an expander opening 56 with the opposing side 52. A screw boss 54 is extruded on the outside surface of the extension 53. Preferably, the outside dimensions between the surfaces 50, 52 permit the corner lock 40 to slide through the hollow core of the channel length 10; the precise dimensions of the corner lock 40 are not critical, as the expander 56 provides a means by which the dimension between the opposing sides 50, 52 may be expanded to permit a tight fit. Fastener holes 57 and 59 are also provided in the face 51 between the opposing sides 50, 52 to accommodate fasteners designed to rigidly fasten the corner lock 40 into the corner of the door construction.

Reference is again made to FIG. 1, which shows the two corner locks 40, 44 positioned in the channel 10 adjacent the respective mitered sides 24, 26 and 36, 38. As is there shown, the one end 42, 46 of each corner lock 40, 44, respectively, lies approximately along the center line of the mitered cut. A fastener 41, 45 is then extended through the side 14 of the channel 10 and through the corner lock 40, 44 and then through the expander 56 to effectuate the expansion of the dimension between the sides 50, 52 of the corner lock 40. It will be appreciated that the corner lock 44 on the right side of FIG. 1 is cut from the same extrusion as the corner lock 40, and thus the fastener 45 likewise extends to an expander portion identical to the expander 56 associated with the corner lock 40.

In the next step, the four corners of the door are then formed by bending the channel 10 around the webs 25, 29, 33 and 37. The corner lock (such as corner locks 40, 44) serves as a mandrel during the bending operation.

Figure 5:
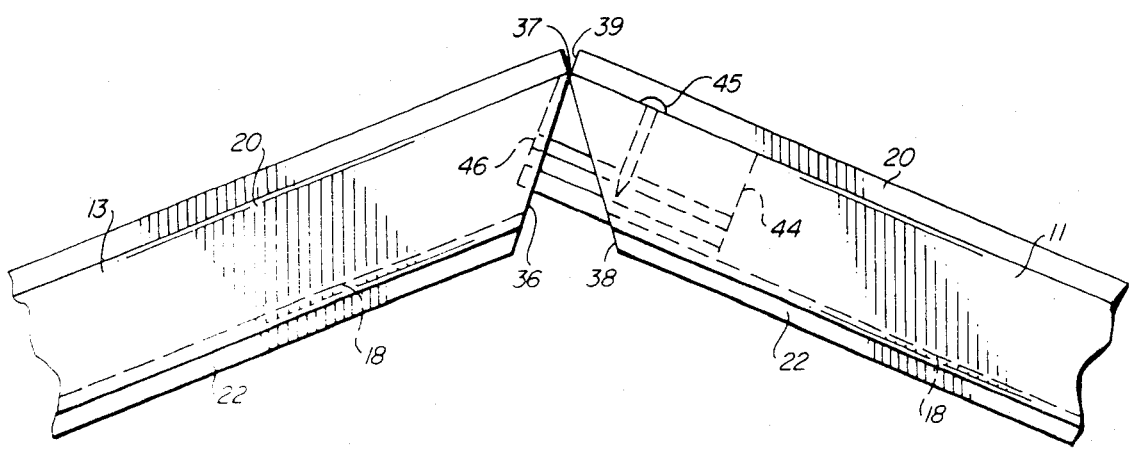
FIG. 5 is a front view of a portion of the construction of FIG. 1, illustrating one step in the method of manufacture.

FIG. 5 shows the bending of the corner formed by mitered sides 36, 38 during this bending operation. It is noted that the corner lock 44 is rendered rigidly joined to the channel portion 11 by the fastener 45.

After the bending of all four corners in a manner similar to that shown in FIG. 5, the resulting door is formed in a generally rectangular configuration such as that shown in FIG. 6.

The steps in the completion of the construction of the sliding patio door in accordance with the present invention will now be described with reference to FIGS. 6 and 7.

Initially, it will be noted that the first two fasteners 41, 45 inserted through the side 14 of the channel lock 10 and into the respective corner locks 40, 44 remain in place; however, for descriptive purposes, the fastener 41 is shown in an exploded view in FIG. 7 which more clearly illustrates the manner in which that fastener 41 extends through the side 14 of the channel 10, through the hole 59 and into the expander 56 of the corner lock 40.

Each corner of the door having a corner lock associated therewith is then provided with three additional fasteners to provide extreme rigidity between the opposite sides of the corner and the corner lock. These three additional fasteners are referred to in FIGS. 6 and 7 by reference numerals 60, 62 and 64. Fastener 60 extends through the side 14 of the channel 10 and thence through hole 57 in face 51 of the corner lock 40, through expander 56 and into screw boss 16. Fastener 62 extends through the side 14 in section 19 of the channel 10 and then into the screw boss 54 of the channel lock 40. Fastener 64 extends through the side 14 of the section 19, between the sides 50, 52 of the corner lock 40 and into that portion of screw boss 18 associated with section 17 of the channel 10. Holes (not shown) along side 14 in section 17 of the channel 10 are positioned between the rails 20, and are indexed with holes 57, 59 of the corner lock to permit access of the fasteners 41, 60. Holes 61, 63 are provided in the side 14 of section 19 outside the rails 20 to permit access by fasteners 62, 64 to the screw boss 61 and screw boss 18 in section 17. As is illustrated, all of the fasteners 41, 60, 62 and 64 comprise threaded sheet metal screws.

Referring now to the bottom right hand portion of FIG. 6, there are three additional fasteners associated with fastener 45, and referred to by reference numerals 66, 68 and 70 correspond to the three additional fasteners associated with corner lock 40, namely fasteners 60, 62 and 64 respectively. The fasteners 66, 68 and 70 serve to rigidly join the sections 11, 13 with the corner lock 44 associated with that corner. Additional fasteners (shown but not numbered with respect to the upper two corners of the door in FIG. 6) may be provided to complete the construction of the door.

Openings along the upper section 15 and the lower sections 11, 19 may be provided to permit the installation of conventional wheel assemblies referred to generally by the reference numeral 72.

It will be noted that the extremities of channel 10 denoted by reference numerals 74 and 76 in FIG. 1 abut each other along the bottom side of the door. Sections 11, 19 of the channel 10 are locked together by a splice gusset 77 having an identical extrusion configuration to that of the corner locks 40, 44 but being somewhat longer. Fasteners 78, 81 extend through the expander section of the splice gusset 77 to firmly lock the gusset in place within the sections 11, 19 of the channel 10.

The patio door shown in FIG. 6 is completed by adding screening 82 locked in the screen spline 22, and a conventional latch 84.

The patio screen door construction of the present invention provides a highly rigid structure not susceptible to the twisting and bending distortions frequently encountered in prior art patio screen doors. It will be noted that the webs 25, 29, 33 and 37 provide a structural strength between adjoining sections of the channel 10, and that the fasteners lock the corner locks 40, 44 to each abutting section in a rigid manner.

I claim:

1. A method for making a rigid, unitized construction for a sliding door, window or other closure from a length of aluminum channel material, said method comprising the steps of:
   (a) forming a lateral mitered slot in said channel, leaving an outer web between the sides of said slot;
   (b) bending said channel laterally along said web so that one side of said slot abuts the other side thereof;
   (c) extending a corner lock through said channel and bridging said slot;
   (d) forming an expander in said corner lock, said expander adapted to receive a fastener so as to expand outwardly and lock said corner lock within said channel;
   (e) extending a first fastener laterally through one side of said channel and through said expander of said corner lock, and transverse to the plane of said slot; and
   (f) extending a second fastener through another side of said channel transverse to said slot and through said corner lock and substantially normal to said first fastener.

2. The method recited in claim 1 further comprising the step of extending a third fastener adjacent and parallel with said first fastener and substantially normal to said second fastener, said third fastener extending through said channel, and expander of said corner lock, and thence into a screw boss of said channel.

3. The method recited in claim 2 further comprising the steps of:
   (a) providing a screw boss formed integrally with said corner lock and extending generally parallel with said expander; and
   (b) extending a fourth fastener generally parallel with said second fastener and extending through said channel and into said screw boss into said corner lock.

4. A method for making a unitized sliding screen door, comprising the steps of:
   (a) providing a length of extruded tubular aluminum formed in a generally rectangular cross-section and with two parallel screw bosses extruded integrally therewith and extending along the inner surface of one side of said rectangular aluminum length;
   (b) cutting four generally 90° miter cuts laterally through said aluminum length at predetermined spaced intervals along that length, each cut extending through said one side and leaving a web of integral aluminum along a second side opposing said first side;
   (c) inserting and fastening a corner lock with said aluminum length and into at least two of said mitered cuts, with one end of each corner lock lying in the plane of the center of the corresponding mitered cut;
   (d) thereafter bending said aluminum length around the web of each mitered cut so that opposite sides of each cut abut each other and form a mitered corner;
   (e) rigidly joining each corner lock with each side of the respective mitered corner by:
      (1) inserting a fastener through one side of the respective mitered corner and extending that fastener through the corner lock and thence into one of the screw bosses of said aluminum length, and
      (2) inserting another fastener through the other side of the respective mitered corner and thence into the other of the screw bosses of said aluminum length;
   (f) gussetting the ends of said aluminum length to complete a rigid rectangular structure; and
   (g) inserting at least two wheels along the bottom portion of said aluminum length, each wheel positioned adjacent a respective corner having a corner lock therein.

5. The method recited in claim 4 further comprising the steps of:
   (a) fitting each said corner lock with an expander operable to expand said corner lock into a tight fit within said aluminim length upon insertion of a fastener therein; and wherein
   (b) said inserting and fastening step includes the step of extending a fastener through one side of said mitered corners having a corner lock therein, through said corner lock and into the expander, wherein said corner lock tightly fits within said aluminum length.

6. The method recited in claim 5 further comprising the steps of:
   (a) fitting each said corner lock with a screw boss; and
   (b) inserting another fastener through said second side of each mitered corner having a corner lock, and thence into said corner lock screw boss.

7. A unitized corner for a sliding door, window or other closure, said corner comprising:
   (a) an L-shaped length of aluminum channel formed with a slot between the two legs of the L and with a web of said channel material integrally connecting the two legs of said L;
   (b) a corner lock extending through said channel and bridging said slot;
   (c) an expander in said corner lock for receiving a first fastener to expand and lock said corner lock in said channel;
   (d) a fastener extending laterally through one leg of said L and into said expander of said corner lock, and transverse to the plane of said slot;
   (e) a screw boss extending longitudinally an inside surface of said channel; and
   (f) a second fastener extending through said channel, said corner lock and into said screw boss substantially normal to said first fastener.

8. The corner construction recited in claim 7 further comprising:
   (a) a second screw boss running parallel to and spaced from said first screw boss in said channel material;
   (b) a third fastener adjacent and parallel with said first fastener, said third fastener extending through said channel, said expander of said corner lock and into said second screw boss of said channel.

9. The corner construction recited in claim 8 further comprising:
   (a) a screw boss formed integrally with said corner lock and extending generally parallel with said expander; and
   (b) a fourth fastener extending generally parallel with said second fastener and through said channel and said screw boss of said corner lock.

10. A rigid corner construction for sliding screen doors, comprising:

(a) an extruded L-shaped length of aluminum channel with a slot between the two legs of the channel and with a screw boss integrally extruded with said channel;

(b) an extruded length of aluminum forming a corner lock slidable through either leg of said channel, said corner lock having an integrally extruded screw boss and expander opening therein;

(c) a first fastener extending through said channel and into said expander of said corner lock;

(d) a second fastener extending transverse to the direction of said first fastener, and through said channel and into said screw boss; and (e) a third fastener extending through said channel, said corner lock and into said screw boss of said channel.

11. The corner construction recited in claim 10 further comprising:

(a) a screw boss formed integrally with said corner lock and extending generally parallel with said expander; and (b) a fourth fastener extending generally parallel with said third fastener and through said channel and said screw boss of said corner lock.

12. A unitized sliding screen door construction comprising:

(a) a length of extruded tubular aluminum formed in a generally rectangular cross-section and with two parallel screw bosses extending integrally therewith and extending along the inner surface of one side of said rectangular aluminum length;

(b) four generally 90° miter cuts laterally through said aluminum length at predetermined spaced intervals along that length, each cut extending through one side and leaving a web of integral aluminum along a second side opposing said first side, with opposite sides of each cut abutting each other to form a mitered corner;

(c) a corner lock extending across each mitered cut and rigidly joined with each side of the respective mitered corner by:

(1) a fastener inserted through one side of each respective mitered corner and through the corner lock and thence into one of the screw bosses of said aluminum length, and (2) another fastener inserted through the other side of each respective mitered corner and thence into the other of the screw bosses of said aluminum length.

13. The unitized sliding screen door construction as recited in claim 12 further comprising:

(a) an expander with each corner lock operable to expand said corner lock into a tight fit within said aluminum length upon insertion of a fastener therein; and (b) a fastener extending through one side of each of said mitered corners having a corner lock therein, through the corner lock and into the expander, wherein the corner lock tightly fits within the aluminum length.

14. The unitized screen door construction recited in claim 13 further comprising:

(a) each corner lock provided with a screw boss extending generally parallel with said expander; and (b) another fastener extending through a second side of each mitered corner having a corner lock, and thence into said corner lock screw boss.

* * * * *